United States Patent [19]

Muramatsu et al.

[11] Patent Number: 5,129,093
[45] Date of Patent: Jul. 7, 1992

[54] METHOD AND APPARATUS FOR EXECUTING AN OPERATION REQUEST SIGNAL IN A LOOSELY COUPLED PARALLEL COMPUTER HAVING PROCESSOR ELEMENTS CAPABLE OF UPDATING MEMORY CONTENTS AND MINIMIZING EXCLUSIVE CONTROL OF SHARABLE DISTRIBUTED MEMORIES

[75] Inventors: Akira Muramatsu, Kawasaki; Ikuo Yoshihara, Tama; Kazuo Nakao, Sagamihara, all of Japan

[73] Assignee: Hitachi, Ltd., Tokyo, Japan

[21] Appl. No.: 272,550

[22] Filed: Nov. 17, 1988

[30] Foreign Application Priority Data

Nov. 18, 1987 [JP] Japan .................. 62-289325

[51] Int. Cl.⁵ .............. G06F 9/06; G06F 13/14; G06F 13/42; G06F 13/16
[52] U.S. Cl. .................. 395/800; 364/228; 364/228.8; 364/229; 364/229.2; 364/229.5; 364/230; 364/230.5; 364/230.6; 364/232.22; 364/240.8; 364/242.94; 364/243.7; 364/255.8; 364/DIG. 1
[58] Field of Search ... 364/900 MS File, 200 MS File

[56] References Cited

U.S. PATENT DOCUMENTS 4,075,691  2/1987  Davis et al. ................. 364/200
4,550,368  10/1985  Bechtolsheim ............... 364/200
4,551,799  11/1985  Ryan et al. .................. 364/200
4,644,461  2/1987  Jennings ..................... 364/200
4,701,848  10/1987  Clyde ........................ 364/900
4,774,659  9/1988  Smith et al. ................. 364/200
4,847,755  6/1989  Morrison et al. ............. 364/200

Primary Examiner—Thomas C. Lee
Assistant Examiner—Daniel Pan
Attorney, Agent, or Firm—Fay, Sharpe, Beall, Fagan, Minnich & McKee

[57] ABSTRACT

A parallel computer has an operation request function and a plurality of processor elements. Each processor element has a sharable distributed memory for holding data, and is interconnected to a network to permit communication. Each processor element comprises a request sent unit for sending an operation request message for causing another processor element connected to a memory module to execute a recursive defining operation. The memory module stores data to be recursively defined. Each processor element further comprises an operation request execution element for accepting a message from another processor, temporarily stopping any other operation of the processor element in accordance with the content of the message, and executing the requested operation. Registers are also used for executing the operation requested by the other processor in addition to the general purpose registers and floating point registers.

17 Claims, 6 Drawing Sheets

FIG. 5

| PROCESSOR ELEMENT 1 | | | PROCESSOR ELEMENT 2 | | |
|---|---|---|---|---|---|
| PROCESSOR (CPU) | | ADDRESS TRANSLATION/ TRANSMISSION UNIT | RECEIVING UNIT | PROCESSOR (CPU) | |
| INSTRUCTION REGISTER | CONTROL STORAGE | | | INSTRUCTION REGISTER | CONTROL STORAGE |
| RECURSIVE OPERATION INSTRUCTION | STORE OPERATION CODE/ADDRESS OF "A"/VALUE OF "B" INTO REGISTER OF ADDRESS TRANSLATION/TRANSMISSION CIRCUIT → <br><br> BRANCH "A" <br><br> CONTINUOUSLY EXECUTE RECURSIVE OPERATION PROCESSING MICROPROGRAM | → SEARCH SEGMENT TABLE <br><br> INVALID = 0 (A IS IN ITS OWN PROCESSOR ELEMENT) <br><br> OTHER PROCESSOR ELEMENT ID NUMBER = EMPTY <br><br> OUTPUT PHYSICAL ADDRESS TO LOCAL MEMORY <br><br> - INFORM TO CPU BY STATUS REGISTER (EXECUTE) | | | |

METHOD AND APPARATUS FOR EXECUTING AN OPERATION REQUEST SIGNAL IN A LOOSELY COUPLED PARALLEL COMPUTER HAVING PROCESSOR ELEMENTS CAPABLE OF UPDATING MEMORY CONTENTS AND MINIMIZING EXCLUSIVE CONTROL OF SHARABLE DISTRIBUTED MEMORIES

CROSS-REFERENCES TO THE RELATED APPLICATION

This application relates to an application U.S. Ser. No. 85646, filed Aug. 14, 1987, now U.S. Pat. No. 4,951,193 entitled "PARALLEL COMPUTER WITH DISTRIBUTED SHARED MEMORIES AND DISTRIBUTED TASK ACTIVATING CIRCUITS" filed Akira Muramatsu et al on Aug. 14, 1987 and assigned to the present assignee, and a copending application U.S. Ser. No. 272,528, filed Nov. 17, 1988, "now abandoned", filed by Akira Muramatsu, Ikuo Yoshihara and Kazuo Nakao, based on Japanese Patent Application No. 62-289323 filed Nov. 18, 1987 and assigned to the present assignee, the disclosure of which applications is incorporated herein by reference.

BACKGROUND OF THE INVENTION

The present invention relates to a parallel computer, and more particularly to a parallel computer having physically distributed sharable memories required when the number of element processors is large.

In a parallel computer, as the number of processor elements increases, respective memory modules are directly connected to a member of physically distributed processor elements, which are coupled by a network to form a loosely coupled parallel computer. In a tightly coupled parallel computer in which a number of processor elements access a memory at one location, performance is low because of competition of access. From a standpoint of software, however, it is advisable that the processor elements share a data structure at logically one location. Recently, therefore, memories which are physically distributed but logically shared (hereinafter called a sharable distributed memory) have been proposed. In JP-A-61-103258, a global addressing memory system is disclosed, in which data is distributed word by word on distributed memories which are shared by all processor elements. In the parallel computer of the U.S. application Ser. No. 85646 filed on Aug. 14, 1987, "now U.S. Pat. No. 4,951,193", a local addressing distributed memory system is disclosed in which data is distributed with overlapping of data segments.

In such a sharable distributed memory, if data to be defined or referred is not present in a memory module in a processor element of its own, a memory module in an other processor element must be accessed by an interconnection network. As a result, processing time is long. Accessing of data A in the memory module in the other processor element consists of the following three operation primitives (which are undecomposable operations).

(1) Reference

R←A (Load A to a register of its own processor)

(2) Definition

A←R (Store a content of a register to the location of A)

(3) Recursive Definition

A←OP (A, R) (Return a result of operation of A with a content of a register to a location of A) or A←OP (A) (Return a result of processing of A to the location of A)

where R is a register of its own processor element, and OP is an operation.

The recursive definition may be decomposed to the reference and the definition. As will be described later, in the case of distributed processing, other operation primitives may be inserted between the reference and the definition so that the result may be changed. Accordingly, it is assumed here that the operation is executed as a single undecomposable primitive. Of the above three operation primitives, the operation primitive (1) may be processed efficiently by reciprocating a reference request message and a response message between processors having message communication functions, and the operation primitive (2) may be processed efficiently by transmitting a store request message. But, the operation primitive (3) needs complex exclusive control When a data is not in a memory module which is directly connected to the processor element requesting the data to be updated, it is necessary in the above proposed method for the processor element to issue a recursive operation instruction to transfer the data to its own memory through a network, update it, and send the result back to the memory module through the network. For example, if the i-th processor element is to execute a program $$A(L(I)) = A(L(I)) + B(I)$$

it is not possible to always allocate A(L(I)) to the i-th processor element in a compiling phase because of the expression which determines an element address of the array A by the indirect index L(I). In such a case, there is no assurance that the program and the data are allocated to the same processor element, and normally other memory modules must be read out. In order to inhibit other processor elements from accessing that data, that memory module must be exclusively accessed. In the above program, the exclusive execution procedure is as follows.

① The i-th processor element calculates the address of A(L(I)).

② A request is issued to the processor element (j-th processor element) connected to the memory module in which A(L(I)) is located to send data through the network.

③ The j-th processor element renders that memory module to an exclusive control area.

④ The j-th processor element reads the data and sends it to the i-th processor element through the network.

⑤ The i-th processor element updates the transmitted data.

⑥ The i-th processor element sends the updated A(L(I)) back to the j-th processor through the network and requests writing into the memory module of the j-th processor element.

⑦ The j-th processor element stores A(L(I)) in the memory and releases the write exclusive control.

Followings are points to be resolved.

(1) Along time is required for updating because the data is updated through the network (②, ④, ⑥).

(2) Since the memory module is exclusively accessed, the memory module of the j-th processor element cannot be used when the data is on the network or being processed in the i-th processor element, and the parallel processing is impeded (③ to ⑦).

The disclosure of the Japanese patent application mentioned above is included in the disclosure of the present application by reference and it is not intended as prior art.

SUMMARY OF THE INVENTION

It is an object of the present invention to provide a loosely coupled parallel computer having a plurality of processor elements which reduces the time required for updating and minimizes exclusive control of a sharable distributed memory.

In accordance with a feature of the present invention to achieve the above object, each processor element of the loosely coupled parallel computer comprises request send means for sending an operation request message to make the processor element connected to the memory module in which data to be defined is stored recursively define that data, requested operation execution means for 1.) accepting that message from the other processor element, 2.) temporarily interrupting the processor element in accordance with the content of the message and 3.) executing the requested operation, and registers to be used for executing the operation requested by the other processor element in addition to general purpose registers and floating point registers to be used when the processor element executes a program assigned thereto.

Where the data to be defined which is designated by an operand of a recursive define instruction is stored in the memory connected to the other processor element, the processor element which executes the program assigned thereto sends the operation request message through the message send means to the other processor element connected to the memory module in which the data A is stored. The message includes ① an address of the data A (to-be-processed data), ② a value of data B (process data) to be processed together with the data A, and ③ a operation code indicating the type of operation. The other processor element, when it receives the operation request message, interrupts the process of itself through the requested operation execution means and stores the address of the to-be-processed data A to an address register of the group of registers prepared for the execution of the requested operation into a process data register, as it does for the value of the process data B, and accesses the memory by using the content of the address register. The to-be-processed data A read is stored into a work register and supplied to an arithmetic operation unit together with the content of the process data register. The arithmetic operation unit executes necessary operations by using the operation code in the operation request message and sends the result back to the work register.

Finally, the content of the work register is stored into the address in the memory module designated by the address register, and the control is returned to the processor. All recursive operations are thus conducted in the processor connected to the memory module in which the data A is stored, and hence, there is no need for transferring data through the network. Since the processor which has received the operation request message cannot accept memory access from its own processors or other processor until the requested operation is completed, exclusive control is attained so that there is no risk that other processor elements will inadvertently access the data being updated.

The parallel process is not impeded because the processor which has sent the operation request message can execute other process during that period.

DESCRIPTION OF THE PREFERRED EMBODIMENTS

Figure 1:
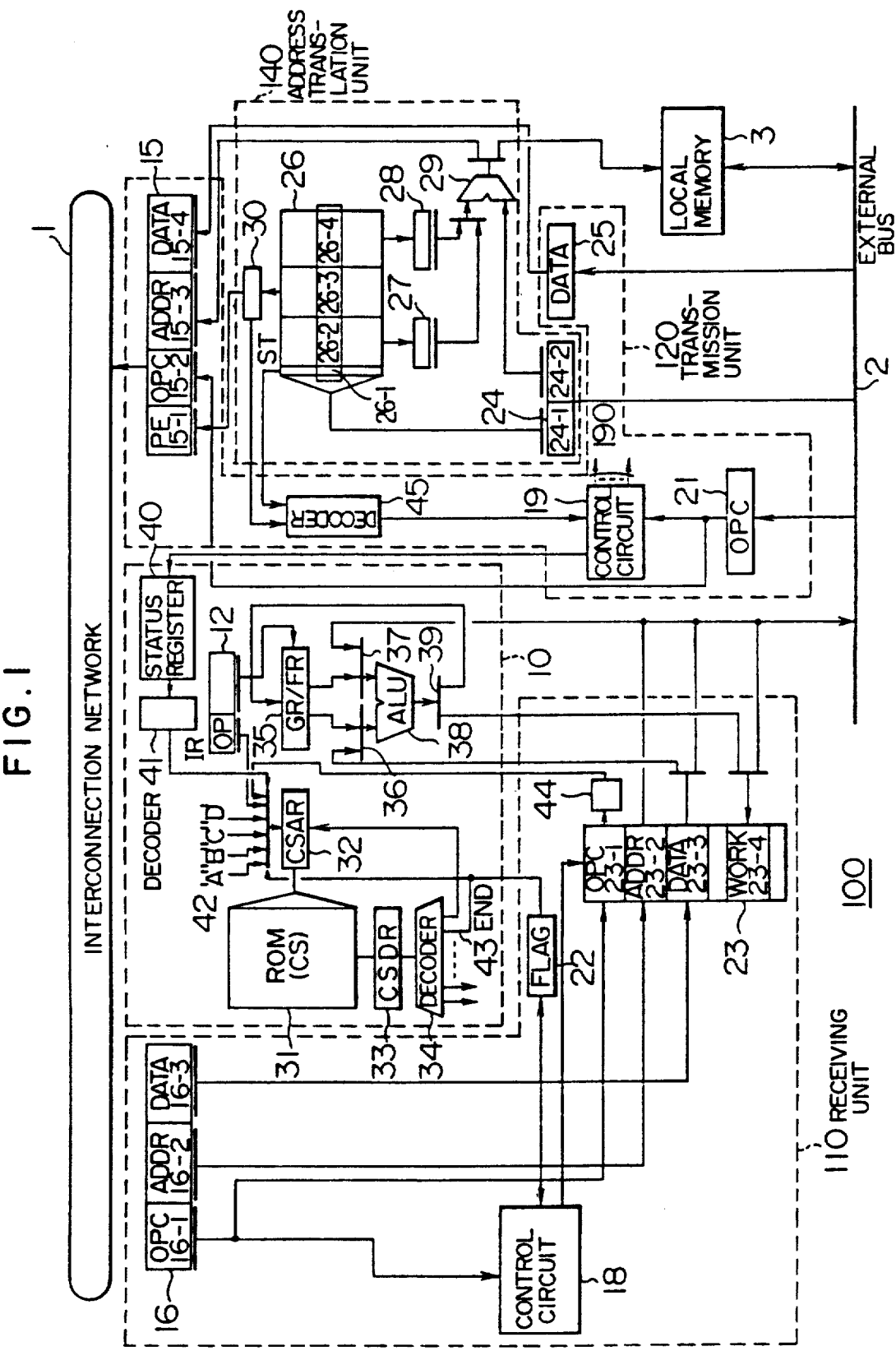
FIG. 1 shows a configuration of a circuit related to the present invention in a processor element of a parallel computer.
Figure 7:
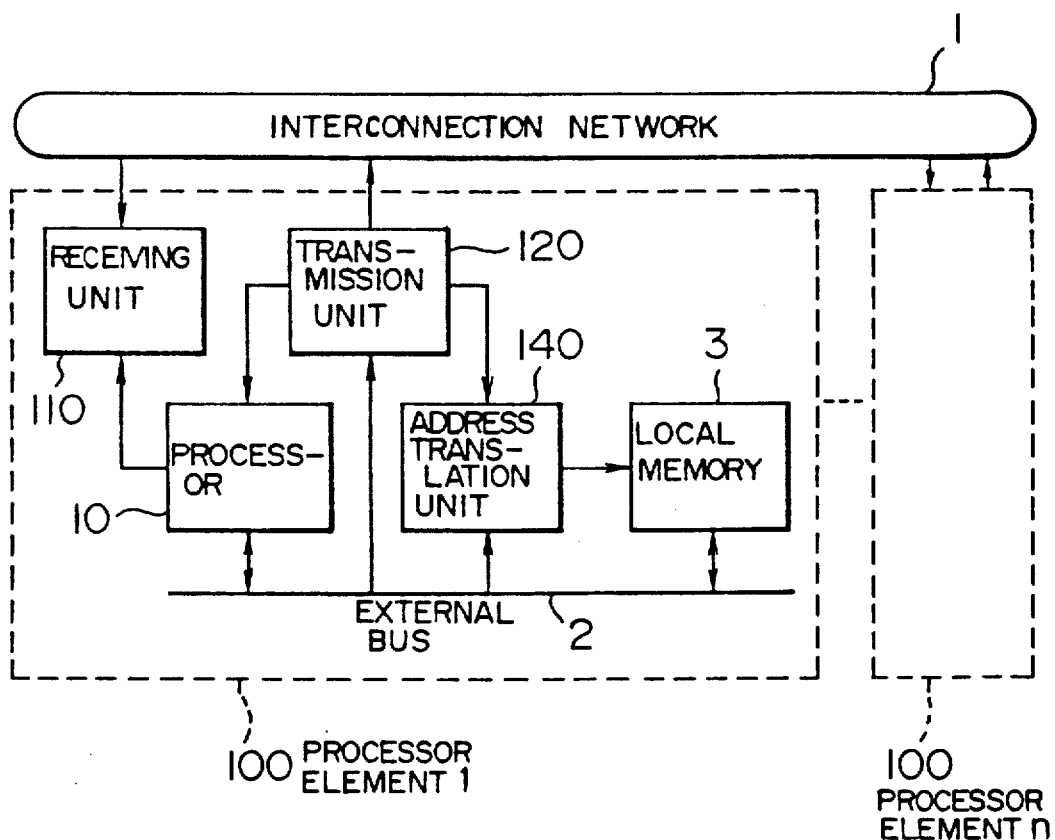
FIG. 7 shows an overall system configuration.

An outline of the information processing system of the present invention is first explained with reference to FIG. 1. FIG. 1 shows a configuration of a processor element. A plurality of processor elements of similar construction are connected to an interconnection network 1 as shown in FIG. 7, although they are omitted in FIG. 1 for simplification. The interconnection network 1 receives a message send request issued by any processor element and transfers the message to the designated processor element. The technique disclosed in the U.S. application based on the Japanese application No. 62-289325 assigned to the assignee of the present invention may be applied to the network 1.

The configuration of the processor element will now be explained. A basic portion of the processor element is a Von Neuman type computer which has a function to communicate through the interconnection network 1. In addition to conventional operational instructions and instructions for the communications, some other instructions unique to the present invention are provided, which will be explained later in detail. Each processor element 100 comprises a processor 10, a local memory 3, a receiver unit 110, a transmitter unit 120 and an address translation unit 140, as shown in FIG. 7. It executes a program stored in the local memory 3. The program to be executed by the processor element is previously stored in the local memory by a host computer (not shown). In FIG. 1, the detail of the circuit is shown but those portions in an arithmetic operation unit, which is a fundamental element of the Von Neuman type computer, not directly related to the present invention are omitted. The local memory 3 and the processor 10 are principal elements of the Von Neuman type computer, and an instruction register hold an instruction under execution. Numeral 31 denotes a control storage. An operation code (OP) field of the instruction register 12 is stored into a control storage address register 32 together with a literal part of the microprogram in the control storage 31 through a selector 42 to designate an address of the control storage corresponding to a machine instruction. When one word of a microinstruction in the control storage 31 is read, it is loaded into the control storage data register 33 and it is translated to various control signals by a decoder 34 to control the operation of the processor element. Numeral 15 denotes an output port register which temporarily stores the message to be sent to the network. It comprises fields 15-1, 15-2, 15-3 and 15-4. Numeral 16 denotes an input port register for storing the message sent from the network. It comprises fields 16-1, 16-2 and 16-3. Numeral 18 denotes a control circuit for the processing of the received message, and numeral 19 denotes a control circuit for the operation request message transmission. Numeral 26 denotes a segment table for address translation. Each entry of the table comprises fields 26-1, 26-2, 26-3 and 26-4. The content of the field 26-1 and the content of the field 26-3 are supplied to a decoder 45 and the output thereof is supplied to the control circuit 19 for the operation request message transmission. Numeral 29 denotes an address adder. Numeral 38 denotes an arithmetic operation unit which receives data from two buses, LBUS 36 and RBUS 37 and outputs a result to a bus ABUS 39. Numeral 35 denotes a group of general purpose registers and floating point registers which are connected to the LBUS 36 and the RBUS 37. Numeral 22 denotes a flag register which informs the processor of the reception of the operation request message. The content thereof is supplied to a selector 42 together with an end of machine instruction cycle signal supplied from the decoder 34. Numeral 23 denotes a group of processing registers for the operation request message, comprising an operation code register 23-1, an address register 23-2, a process data register 23-3 and a work register 23-4. The registers 23-1 to 23-3 may be substituted by the input port registers 16-1 to 16-3. The content of the operation code register 23-1 is conveyed to the decoder 44 and the output thereof is conveyed to the selector 42. Numeral 40 denotes a status register for the control circuit 19, and numeral 41 denotes a decoder therefor.

Figure 2:
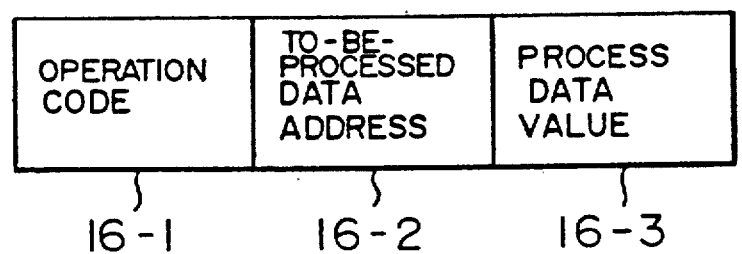
FIG. 2 shows a configuration of an input port register.

The fields of the input port register 16 are explained with reference to FIG. 2. The fields of the input port register 16 may have various meanings depending on the type of message. The operation request message pertinent to the present invention is explained below. An operation code indicating the content of the requested operation is stored in the first field 16-1 of the input port register 16. An address of the to-be-processed data is stored in the second field 16-2, and the value of the process data is stored in the third field 16-3.

Figure 3:
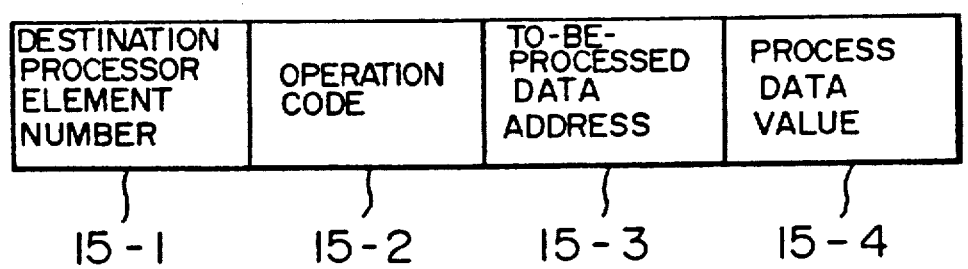
FIG. 3 shows a configuration of an output port register, FIG. 4 explains an operation of a recursive operation of data in an other processor element, FIG. 5 explains an operation of a recursive operation of data in its own processor element, FIG. 6 explains an operation of a recursive operation of data both in its own processor element and an other processor element.

The fields of the output port register 15 are now explained with reference to FIG. 3. Like the fields of the input port register, the fields of the output port register 15 may have various meanings depending on the type of message. The operation request message which is pertinent to the present invention is explained below. An identification number of a designated processor element of the message is stored in the first field 15-1 of the output port register 15. The same information as that of the input port register is stored in the remaining fields. Namely, the operation code is stored in the second field 15-2, the address of the to-be-processed data is stored in the third field 15-3, and the value of the process data is stored in the fourth field 15-4.

The operation of the circuit of the present invention is explained in detail with reference to FIG. 1. It is assumed that the processor element 1 issues the following instruction of recursive operation $A = A * B$ for the data A,

ROP R1, R2, R3 where R1, R2 and R3 are general register numbers in which the address of A, the value of B and the operation code are stored respectively. Where A is in an other processor element, that other processor element is designated by a processor element 2. The recursive operation instruction also includes

ROP R1, R3

For example, it shifts A or reverses a sign of A. Since the basic operation is the same as that of the first instruction, the explanation is focused to the first instruction.

Operation of Processor 1

When the recursive operation instruction is fetched and loaded into the instruction register 12, the operation code (OP) field thereof is stored into the control storage address register 32 together with the literal part of the microprogram in the control storage, and the area of the control storage designated by the content thereof, that is, the recursive operation instruction execution microprogram is fetched to the control storage data register 33 word by word, and they are translated to the control signals by the decoder 34. First, the recursive operation code in the general register R3, designated by the operand, is stored in the register 21 through the external bus 2, and the data B in the general register R2 is stored in the register 25. Then, the address is sent from the general register R1 to the external bus and the reading of the data A is started. The address consists of a segment field and an offset field. After it has been latched in the register 24, the segment field 24-1 is supplied to a segment table 26 where it is translated to a physical address. Of the fields of the entries of the segment table, a field 26-1 is an INVALID field, which is "0", if the segment including the data A is present in its own processor element, and "1" if it is not present. A field 26-2 stores the physical address of the segment, which is supplied to the register 27. A field 26-3 stores an processor element identification number if the segment is present in other processor element, and a code indicating vacancy if the segment is not present in the other processor element. It is supplied to the register 30. A field 26-4 stores a virtual address of the segment in the other processor element. It is supplied to the register 28. In the present invention, for simplification purpose, it is assumed that only one segment is present in other processor element for one segment, but the number of segments which are present in other processor element may be increased if a plurality of fields 26-3 and 26-4 are held in a list. The contents of the fields 26-1 and 26-3 are decoded by the decoder 45 and the output thereof is supplied to the control circuit 19. Various operations are executed depending on the combination thereof.

(1) INVALID=0 and Field 26-3=empty

The segment is present in its own processor element and not present in other processor element. In this case, the control circuit 19 stores into the status register the code EXECUTE indicating the processing by its own processor, and sends the offset field 24-2 of the register 24 and the content of the register 27 (physical address of the segment) to the address adder 29, which outputs the physical address of the data A, which is sent to the local memory 3. On the other hand, the content of the status register 40 is decoded by the decoder 41 and the output thereof is sent to the selector 42. If it is the code EXECUTE, "A" is set into the control storage address register 32. The address points the next step of the recursive operation processing microprogram which adds the to-be-defined data A and B in R2. Accordingly, the recursive operation is carried out in its own processor element.

(2) INVALID=1 Field 26-3=other element processor identification number

The segment is not present in its own processor element but is present in other processor element. In this an case, the control circuit 19 stores in the status register 40 the code INVALID indicating that its own processor does not process it, and sends the offset field 24-2 of the register 24 and the content of the register 28 (virtual address of the segment in the other processor element) to the address adder 29, which outputs the virtual address in the other processor element of the data A and it is sent to the field 15-3 of the output port register 15. The contents of the data register 25, the register 21 and the register 30 are sent to the fields 15-4, 15-2 and 15-1 of the output port register, respectively. The message thus formed is sent to the processor element in which the data is present through the interconnection network. The operation of the processor element in the receiving station will be described later.

On the other hand, if the content of the status register 40 is the code INVALID, the selector 42 sets "B" as the content of the control storage address register 32 by the signal supplied from the decoder 41. This points the address of the microinstruction (check of flag 22, fetch of the next machine instruction, etc.) to be executed at the last of the instruction cycle of the machine instruction. Accordingly, the recursive operation is skipped in its own processor element.

(3) INVALID=1 and Field 26-3=empty

The segment is not present in its own processor nor in other processor element. In this case, the control circuit 19 stores in the status register 40 a code EMPTY indicating that the data is not present, and does not translate the address. If the content of the status register 40 is the code EMPTY, an address "C" of the microinstruction for error handling is set into the control storage address register 32.

(4) INVALID=0 and Field 26-3=other processor element identification number

The segments are present in both its own processor element and an other processor element. In this case, the control circuit 19 stores in the status register 40 the code EXECUTE indicating that it is to be processed by its own processor, and sends the content of the offset field 24-2 of the register 24 and the content of the register 27 (physical address of the segment) to the address adder, as they are sent in the case (1). The address adder 29 outputs the physical address of the data A, which is sent to the local memory. Then, the content of the offset field 24-2 and the content of the register 28 (virtual address of the segment in the other processor element) are sent to the address adder 29, as they are sent in the case (2). The address adder 29 outputs the virtual address in the other processor element and it is sent to the field 15-3 of the output port register 15. The contents of the data register 25, the register 21 and the register 30 are sent to the fields 15-4, 15-2 and 15-1 of the output port register, respectively. The message thus formed is sent to the processor element in which the data is present through the interconnection network 1.

On the other hand, when the code of the status register 40 is the code EXECUTIVE, the microprogram for the recursive operation starting with the addition of the data A and the data B in R2 is continuously executed, as it is in the case (1).

Operation of Processor Element 2

When the control circuit 18 in the receiving station receives the operation request message in the input port register 16, it reads the operation code field 16-1. If the result is the request for the recursive operation and the content of the flag register 22 is "0", it stores the operation code into the operation code register 23-1, the address of the to-be-processed data A in the message into the address register 23-2, and the value of the process data B into the process data register 23-3, and sets the flag register 22 to "1" to interrupt the processor 10. The microprogram of the processor 10 outputs an END signal 43 at the end of instruction cycle and it is sent to the selector 42 together with the content of the flag register 22. When the selector detects the interruption by the content of the flag register 22, the selector 42 sets the address "D" into the control storage address register 32 and moves into the interruption processing. The interruption processing, that is, the execution of the recursive operation is conducted at the microprogram level, and buffering of registers is not conducted. The processor 10 executes the microprogram. It is prevented from double interruption by other processor element during the execution. Accordingly, the recursive operation requested by the operation request message is conducted exclusively.

The interruption processing program for the recursive operation accesses the local memory by the content of the address register 23-2 as the address, and stores the data A (to-be-processed data) thus read into the work register 23-4. The contents of the work register 23-4 and the process data register 23-3 are sent to the RBUS 36 and the LBUS 37, respectively, and then supplied to the operation unit 38 which operates them in accordance with the operation code and outputs the result on the ABUS 39. It is then supplied to the work register 23-4. Finally, the content of the work register 23-4 (calculation result) is stored into the area in the local memory pointed by the content of the address register 23-2 and the flag register 22 is reset to terminate the interruption processing of the recursive operation.

It is now explained with reference to FIGS. 4 to 6 that the recursive operation is correctly executed in various cases by the circuit of the present invention.

Figure 4:
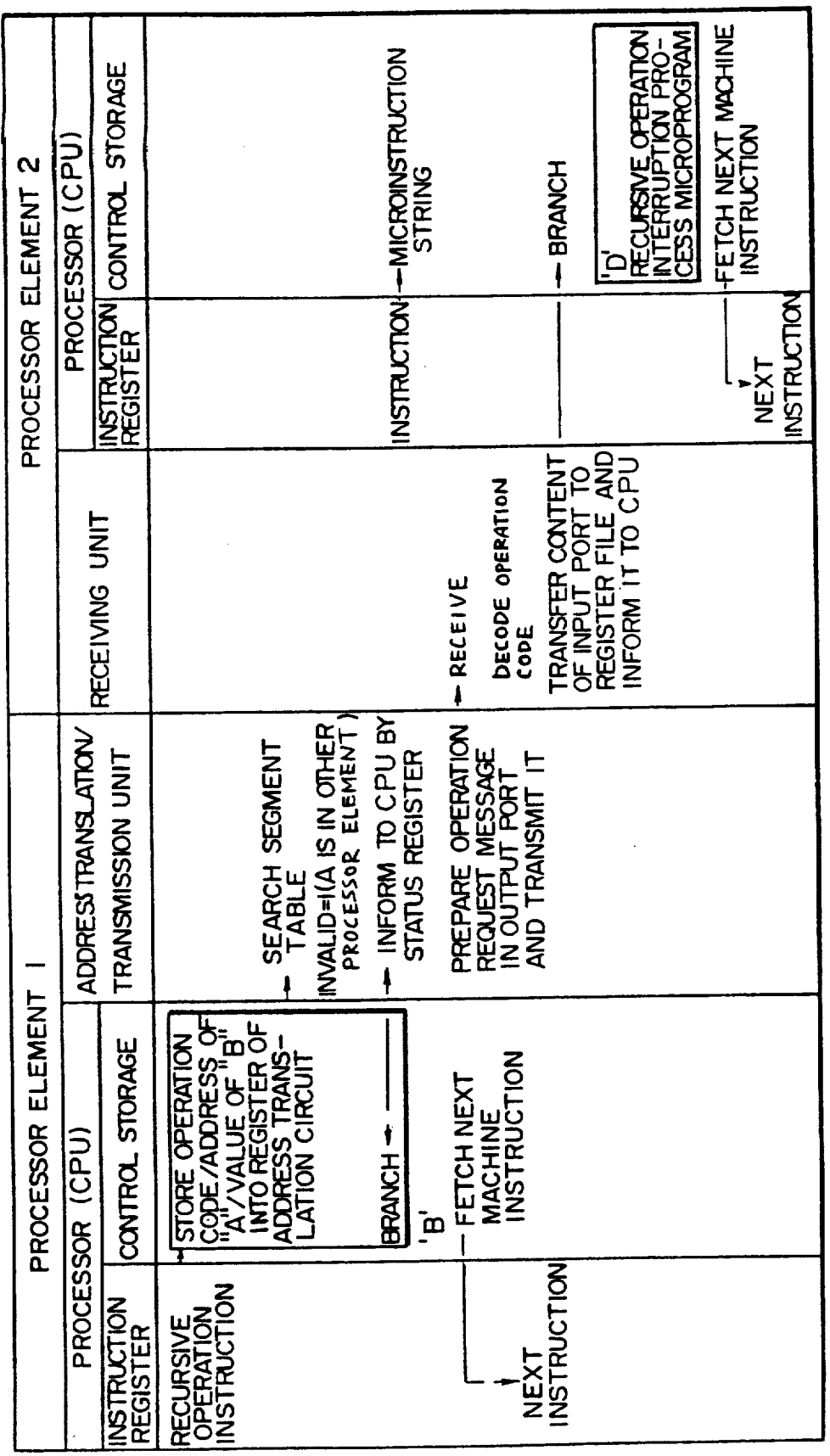

In FIG. 4, the processor element 1 issues the instruction of recursive operation A=A * B for the data A, and the data A is present in the memory module linked to other processor element J. When the recursive operation instruction is fetched, the microprogram of the processor element 1 stores the operation code of the recursive operation in the register R3 of the general register 35 and the data B in the register R2 into the registers 21 and 25 provided in the present invention, respectively, sends the address of the data A in the register R1 to the external bus 2, and starts the reading of the memory. The segment field 24-1 of the address of the data A is translated to the physical address of the segment through the segment table 26. If the segment is not present in its own processor element, the bit INVALID=1 in the segment table is supplied to the control circuit 19 at the transmission station of the present invention. The identification number of the other processor element in which the segment described on the segment table 26 is present is also supplied to the control circuit 19. When the identification number of the other processor element is not empty, the control circuit 19 prepares the operation request message in the output port register 15 and sends it to the other processor element through the interconnection network 1. The reading of the memory is interrupted, and it is informed to its own processor by writing the code INVALID into the status register 40 for the control circuit. The microprogram of the processor 10 so informed is branched to the address "B" to terminate the execution of the machine instruction, and starts to fetch the next machine instruction. On the other hand, the control circuit 18 of the processor element 2 which has received the operation request message transfers the content of the input port register 16 to the register file 23 of the present invention and then informs the processor 10 by the flag register 22. The processor 10 so informed branches to the recursive operation interruption processing microprogram (address "D") at the last of the machine instruction cycle, and executes the operation based on the information in the register file 23. Thereafter, it fetches the next machine instruction.

In FIG. 5, the processor element 1 issues the recursive operation instruction for the data A and the data A is present in the memory module of the processor element 1. (INVALID bit=0 and the other processor element identification number is empty). In this case, the local memory is read by the segment physical address in the segment table 26, and the code EXECUTE indicating that it is processed by its own processor 10 is stored into the status register 40 of the control circuit. By this code, the microprogram proceeds to the recursive operation step (address "A") following to the memory readout, and the operation request message is not sent.

Figure 6:
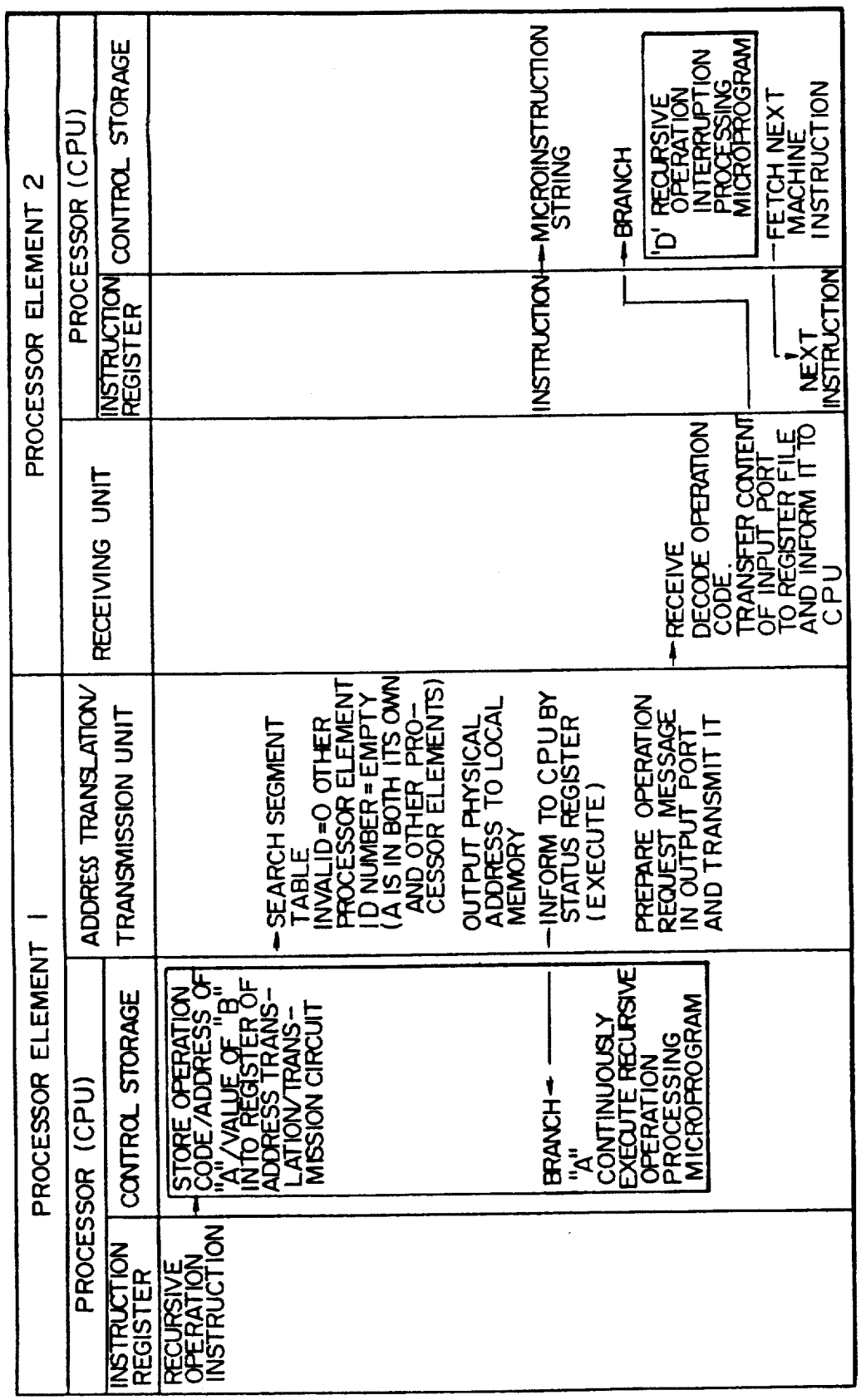

In FIG. 6, the data A is present in both its own processor element and other processor element. (INVALID bit=0 and the other processor element identification number is not empty). In this case, the control circuit 19 determines the physical address of the data A based on the segment physical address in the segment table 26, and supplies the local memory. The code EXECUTE indicating the processing by its own processor is stored into the status register 40. By this code, the microprogram of its own processor 10 proceeds to the recursive operation step (address "A") following to the memory access. Then, the control circuit 19 prepares the operation request message in the output port register 15 based on the other processor element identification number and the segment address in the segment table 26, and sends it through the interconnection network 1. When the control circuit 18 of the processor element 2 receives the operation request message, it transfers the content of the input port register 16 to the register file 23 of the present invention as it does in FIG. 4, and informs it to the processor 10 by the flag register 22. The processor 10 so informed branches to the recursive operation interruption processing microprogram (address "D") at the last of the machine instruction cycle and executes the process based on the information in the register file 23. Then, it fetches the next machine instruction.

In the present invention, all recursive operations are executed by the operation unit of the processor in which the data A to be recursively processed is present, and it is no longer necessary to for the processor having the data A to be recursively processed upon request from the processor executing the program through the network, to read the data A and send it to the processor executing the program through the network for the processing, and receive the resultant data through the network, as is done in the prior art. As a result, both processors have no wasteful wait time during the execution of the operation and it is not necessary to set an exclusive control area to prevent other processor from reading the data A under the recursive operation during the wait time. The processor executing the program may start the execution of the next instruction immediately after it has sent the recursive operation request message to the network. When the processor having the data A to be recursively processed receives the recursive operation request message, it temporarily stops the operation of the processor and preferentially process the requested operation. It is not necessary to buffer the contents of the registers or set the exclusive control area. An other processor is not unduly limited to access the data.

What is claimed is:

1. A method for executing an operation request to exclusively execute a procedure in a parallel computer having a plurality of processor elements each having a memory for holding data interconnected through a network to permit communication, said method comprising steps of:
   sending from a first processor element to a second processor element an operation request including a first data held in a first memory connected to the first processor element, an address to designate a second data in a second memory connected to the second processor element and an operation code designating an operation to be applied to the first and second data;
   reading the second data from the second memory by said address sent from said first processor element to said second processor element,
   applying said operation to the first data and the second data in said second processor element in response to said operation request; and,
   storing third data into the second memory, said third data being a result of the operation.

2. The method for executing an operation request according to claim 1 further comprising steps of, in response to said operation request, interrupting another operation under execution by the second processor element, and executing the operation requested by said operation request.

3. The method for executing an operation request according to claim 1 further comprising a step of writing by the second processor element the third data into a same memory location of the second memory at which the second data had been stored.

4. The method for executing an operation request according to claim 1 further comprising a step of determining, by the first processor element, to which of the plurality of processor elements to send the operation request based on a contents of the operation request.

5. A parallel computer having a plurality of processor elements operable in parallel and each connected to each other for communication therebetween, each processor element having substantially the same structure, said parallel computer comprising:
   first means for sending out an operation request including first data held in a first memory, an address for designating second data in a second memory and an operation code designating an operation to be applied to the first and second data; and,
   second means for receiving the operation request, reading the second data from the second memory in response to the address in the operation request, applying the operation designated in the operation request for the second data and the first data in the operation request and storing a result of the operation into the second memory, all in an exclusive manner.

6. The parallel computer according to claim 5 wherein said second means includes means for interrupting an operation other than the operation requested by other operation request under execution by the processor and executing the operation requested by said operation request.

7. The parallel computer according to claim 5 wherein said second means includes means for writing the result of the operation into a memory location of the second memory at which the second data has been stored, and said first means includes means for determining a presence of another external memory to send out the operation request, based on said address in response to said first data and the operation request designating said address.

8. A processor element for use in a parallel computer having a plurality of processor elements of a substantially identical structure communicatively interconnected through a network, the processor element comprising:
execution means for executing an assigned one of task programs to be executed by the parallel computer,
a first memory for holding data including a first data at a first address, used in the assigned one task program;
operation request generation and send means for generating a second address to designate a second data in a second memory connected to a second processor element, reading the first data from said first memory, generating information on a first operation to be performed on the first data and the second data, generating an operation request including said second address, said first data and said operation information, and sending the operation request to the second processor element through the network;
operation request accept means connected to said network for accepting a second operation request including a third address to designate a third data in said first memory, a fourth data in said second memory of said second processor element, and operation information for designating a second operation to be applied to said third and fourth data; and,
operation execution control means responsive to the second operation request accepted by said operation request accept means for reading the third data corresponding to the third address under request from said first memory, executing the second operation designated by the second operation request on said third and fourth data by said execution means and storing a result of the second operation by said execution means into said first memory.

9. A processor element for use in a parallel computer having a plurality of processor elements of a substantially identical structure communicatively interconnected through a network, the processor element comprising:
execution means for executing an assigned one of task programs to be executed by the parallel computer,
a first memory for holding data including a first data at a first address, used in the assigned one task program;
operation request generation and send means for generating a second address to designate a second data in a second memory connected to a second processor element, reading the first data from said first memory, generating information on a first operation to be performed on the first data and the second data, generating an operation request including said second address, said first data and said operation information, and sending the operation request to the second processor element through the network;
operation request accept means connected to said network for accepting a second operation request including a third address to designate a third data in said first memory, a fourth data in said second memory of said second processor element, and operation information for designating a second operation to be applied to said third and fourth data; and,
operation execution control means responsive to said second operation request accepted by said operation request accept means for reading the third data corresponding to the third address under request from said first memory, interrupting an execution of an other task program being executed by said execution means, executing the second operation designated by the second operation request on said third and fourth data by said execution means, storing a result of the second operation by said execution means into said first memory, and resuming execution of the other task program in response to termination of execution of the second operation request.

10. The processor element according to claim 9 wherein said operation execution control means includes a control memory for storing a microprogram to execute a recursive operation interruption process.

11. A processor element for use in a loosely coupled parallel computer having a plurality of processor elements of substantially identical structure interconnected through a network to permit communication, the processor element comprising:
a processor for executing an assigned one of a plurality of task programs to be executed by the parallel computer;
a first memory for holding a first data;
address generation means for generating a second data designating address to designate a second data in a second memory connected to a second processor element;
operation designation means for designating a first operation to be applied to said first and second data;
request send means for reading said first data from said first memory, generating a first operation request including said first data, the second data designation address supplied from said address generation means and code information corresponding to the first operation from said operation designation means, and sending the first operation request to said second processor element;
operation request accept means for accepting a second operation request including a third data designation address to designate a third data of said first memory, a fourth data in the second memory of said second processor element and code information on a second operation to be applied to said third and fourth data;

read means for reading said third data from said first memory in response to the third data designation address;

execution means for executing the second operation designated by said second operation request for the third data from said read means and the fourth data included in said second operation request;

store control means for storing a result of the second operation by said execution means into said first memory; and, means for exclusively operating said request accept means, said read means, said execution means and said store control means during processing of any operation request.

12. The processor element according to claim 11 wherein said request accept means includes a group of registers for receiving said operation request in message packet form and holding a content thereof.

13. The processor element according to claim 11 wherein said first and second memories are sharable distributed memories.

14. A method for processing data in a loosely coupled parallel computer including a plurality of processor elements utilizing a physically distributed and logically shared memory structure, the memory structure includes a plurality of memory modules which store data and each of which are connected to a corresponding one of the plurality of processor elements, the method comprising steps of:

generating by a first processor element of an operation request packet specifying an operation to be performed on the data;

determining by the first processor element the location of the data, wherein the location comprises a memory module of a second processor element;

sending by the first processor element the operation request packet, comprising first data, an address which designates second data, and an operation code which designates the operation to be applied to the first and second data, to the second processor element;

accepting by the second processor element the operation request packet;

performing by the second processor element the operation on the data in accordance with the operation request packet; and, storing by the second processor a result of the operation on the data in the memory module of the second processor element;

whereby the performing by the second processor of the operation in accordance with the operation request packet obviates locating the data, transferring the data to the first processor element, performing the operation in the first processor element, and transferring the data back to the second processor element for an improved reduction in processing time.

15. A loosely coupled parallel computer including a plurality of processor elements which utilize a physically distributed and logically shared memory structure, the memory structure including a plurality of memory modules, each memory module being directly connected to a corresponding one of the plurality of processor elements, the loosely coupled parallel computer comprising:

generation means for generating an operation request packet, the operation request packet containing code information on an operation to be executed on data, the code information comprising first data, an address which designates second data, and an operation code which designates the operation to be applied to the first and second data;

determining means for determining a location of the data comprising a memory module of a processor element;

sending means for sending the operation request packet to the processor element;

accepting means for accepting the operation request packet in the processor element;

execution means for executing the operation in the processor element on the data in accordance with the code information; and, storing means for storing in the memory module of the processor element a result of the execution of the operation.

16. The loosely coupled parallel computer of claim 15 wherein the generation means is an integral part of the processor element.

17. The loosely coupled parallel computer of claim 15 wherein the generation means is an integral part of another processor element.

* * * * *